United States Patent
Naenko et al.

(10) Patent No.: US 11,256,534 B2
(45) Date of Patent: *Feb. 22, 2022

(54) SYSTEM AND METHOD FOR TRAPPING SYSTEM CALLS FOR REMOTE EXECUTION

(71) Applicant: Parallels International GmbH, Schaffhausen (CH)

(72) Inventors: Andrey Naenko, Moscow (RU); Alexey Koryakin, Moscow (RU); Nikolay Dobrovolskiy, Moscow (RU); Serguei M. Beloussov, Costa del Sol (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,455

(22) Filed: Sep. 4, 2020

(65) Prior Publication Data

US 2020/0401439 A1    Dec. 24, 2020

Related U.S. Application Data

(63) Continuation of application No. 15/986,892, filed on May 23, 2018, now Pat. No. 10,768,966.

(51) Int. Cl.
*G06F 9/455* (2018.01)
*H04L 67/01* (2022.01)

(52) U.S. Cl.
CPC ...... *G06F 9/45558* (2013.01); *G06F 9/45545* (2013.01); *G06F 2009/45583* (2013.01); *G06F 2009/45591* (2013.01); *G06F 2009/45595* (2013.01); *H04L 67/42* (2013.01)

(58) Field of Classification Search
CPC ............ G06F 9/45558; G06F 9/45545; G06F 2009/45583; G06F 2009/45591; G06F 2009/45595; H04L 67/42
See application file for complete search history.

(56) References Cited

U.S. PATENT DOCUMENTS

7,596,677 B1    9/2009   Koryakin et al.
7,865,893 B1    1/2011   Omelyanchuk et al.

*Primary Examiner* — Gregory A Kessler
(74) *Attorney, Agent, or Firm* — Rosenberg, Klein & Lee (57) ABSTRACT

Disclosed are systems and methods for executing system calls in a virtualized environment. A method includes executing, on a host, a host process corresponding to a guest process executing within a virtual machine and having an associated guest-process virtual address space, the host process having an associated host-process virtual address space. The method also includes mapping the host-process virtual address space and the guest-process virtual address space to a host physical memory, trapping a system call invoked by the guest process, and performing the trapped system call using the host process, wherein state changes in the host-process virtual address space caused by the trapped system call are reflected in the guest-process virtual address space. The method further includes causing execution of the guest process to be resumed after performing the trapped system call.

20 Claims, 6 Drawing Sheets

SYSTEM AND METHOD FOR TRAPPING SYSTEM CALLS FOR REMOTE EXECUTION

RELATED APPLICATIONS

This application is a continuation application of co-pending U.S. patent application Ser. No. 15/986,892, filed May 23, 2018, which is herein incorporated by reference.

FIELD OF TECHNOLOGY

The present disclosure relates generally to the field of computer virtualization, more specifically, to systems and methods of executing system calls in a virtualized environment.

BACKGROUND

With virtual machine technology, a user can create and run multiple operating environments on a server at the same time. Each operating environment, or virtual machine, requires its own "guest" operating system (OS) and can run software applications independently from the other virtual machines. Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs. Additional customer uses for VMs include cloud services, targeted production server consolidation, hosting of legacy applications (older versions), and computer or server backup.

Guest programs, as with any user application, may perform one or more system calls of the guest OS kernel as part of its execution. As an example, a guest program may make an I/O system call to access its virtual disk, a system call that ultimately requires physical device access. Consequently, this system call triggers a "VM Exit" event that transfers control from the guest program to the virtual machine monitor, then a switch to the host operating system, and then a switch to a thread that implements an appropriate virtual device (e.g., virtual device emulator). As such, such I/O operations or other system calls by a guest program can be slow and resource-expensive due to the cost of numerous context switches between the various layers in the virtualization stack.

SUMMARY

Aspects of the present disclosure are able to skip this costly path by running a guest program on the host side and route at least some performance-critical system calls directly to the host kernel. To facilitate this technique, aspects of the present disclosure maintain a copy of guest program address space on the host side. Host physical memory pages are shared to make sure all state changes of a program on the guest side are reflected on the host side, and vice versa. Aspects of the present disclosure are also configured to trap system calls of a guest program on both host and guest sides. Thus, a system and method is disclosed herein for executing system calls in a virtualized environment, and, more particularly, for trapping system calls for remote execution in a virtualized environment.

In one aspect of the present disclosure, to improve execution speed, particularly in situations in which a guest program makes many system calls that can be accelerated using the aforementioned approach, a virtual machine monitor executes the system call starting from the host side instead. To do so, the virtual machine monitor traps a system call and routes the system call directly to the host kernel. Otherwise, the virtual machine monitor may instead route the system call through the full virtualization stack and continue execution from the guest kernel's system call entry point. Subsequently, the guest program may continue to run on the guest side, and may eventually switch execution back to the host side depending on a particular workload. Accordingly, aspects of the present disclosure are able to speed up select operations (e.g., I/O system calls) performed by programs running in a fully virtualized environment.

According to one aspect, a method is provided for executing system calls in a virtualized environment. The method includes executing a guest process within a virtual machine and having an associated guest-process virtual address space, executing, on a host, a host process corresponding to the guest process and having an associated host-process virtual address space, and mapping the host-process virtual address space and the guest-process virtual address space to a same host physical memory. The method further includes trapping a system call invoked by the guest process, and determining whether to perform the trapped system call using the guest process or the host process based on a type of the trapped system call. The method includes performing the trapped system call using the host process, wherein state changes in the host-process virtual address space caused by the trapped system call are reflected in the guest-process virtual address space, and resuming execution of the guest process in response to completing execution of the trapped system call.

In another aspect, trapping the system call invoked by the guest process further includes protecting a model-specific register associated with a system-call target address from at least one of read access and write access, and catching a general protection exception caused by the guest process attempting to read the protected model-specific register associated with the system-call target address.

In another aspect, the method further includes, responsive to determining the general protection exception is associated with an emulated system call, extracting a system call number and one or more system-call arguments associated with the trapped system call.

In another aspect, mapping the host-process virtual address space and the guest-process virtual address space to the same host physical memory further includes intercepting a memory-management system call to modify a memory mapping of the guest-process virtual address space, and performing the modification of the memory mapping on both the guest-process virtual address space and the host-process virtual address space.

In another aspect, mapping the host-process virtual address space and the guest-process virtual address space to the same host physical memory further includes invoking a memory mapping API call to map at least a portion of a guest virtual address space range to a context of the host process.

In another aspect, performing the trapped system call using the host process further includes modifying access protection of the host-process virtual address space to protect the host-process virtual address space from access, and in responsive to a protection fault caused by the system call attempting to access a portion of the host-process virtual address space, mapping a new guest page to the accessed portion and release protection of the accessed portion.

In another aspect, performing the trapped system call using the host process further includes, responsive to determining that the trapped system call includes a guest data pointer referencing a portion of the guest-process virtual address space, substituting the guest data pointer with a host data pointer referencing the same portion of the guest-process virtual address space.

In another aspect, the method further includes, responsive to determining that the trapped system call is suitable for the guest process, forwarding the trapped system call through a virtualization stack of the virtual machine for handling.

According to one aspect, a system is provided for executing system calls in a virtualized environment. The system includes a physical memory device and a processor. The processor is configured to execute a guest process within a virtual machine and having an associated guest-process virtual address space, execute a host process corresponding to the guest process and having an associated host-process virtual address space, and map the host-process virtual address space and the guest-process virtual address space to a same host physical memory of the physical memory device. The processor is further configured to trap a system call invoked by the guest process, determine whether to perform the trapped system call using the guest process or the host process based on a type of the trapped system call. The processor is further configured to perform the trapped system call using the host process, wherein state changes in the host-process virtual address space caused by the trapped system call are reflected in the guest-process virtual address space, and resume execution of the guest process in response to completing execution of the trapped system call.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for executing system calls in a virtualized environment. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
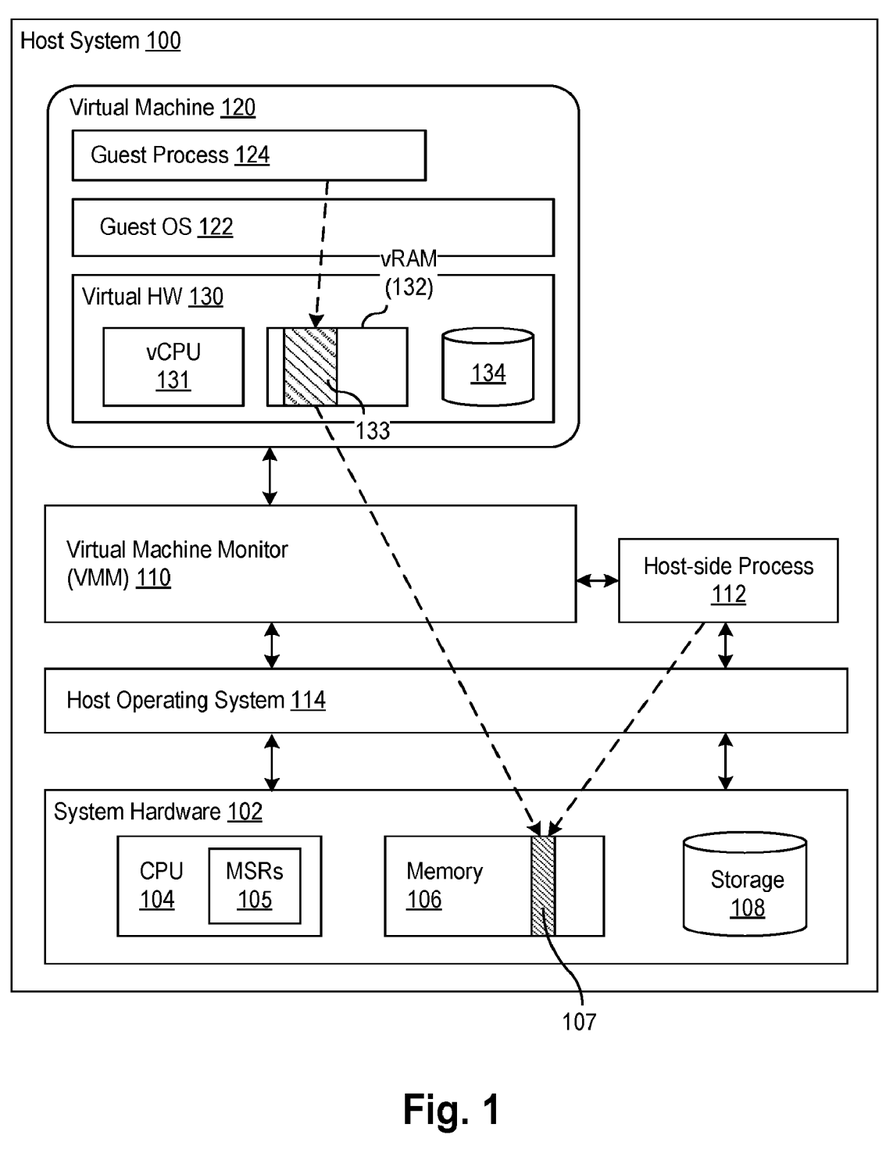
FIG. 1 is a block diagram illustrating a system for executing system calls in a virtualized environment, according to an exemplary aspect.

FIG. 1 is a block diagram illustrating a host system 100 for executing system calls in a virtualized environment, according to an exemplary aspect. As shown, the host system 100 generally includes one or more virtual machines 120 that can be created on a host platform that includes system hardware 102, a host operating system 114, and a virtual machine monitor 110 (also known as a hypervisor or a virtualizer). The virtual machine monitor 110 (hereinafter referred to as "VMM 110") provides a guest operating system 122 of the virtual machine 120 with a virtual operating platform (depicted as virtual hardware 130) and manages execution of the guest OS 122. The VMM 110 may run directly on the underlying system hardware 102 or as an application or component running within a host operating system (not shown) installed on the system hardware 102. Exemplary operations of a VMM 110 in various configurations are described in greater detail in U.S. Pat. No. 7,865,893 B1, "System and Method for Starting Virtual Machine Monitor in Common with Already Installed Operating System", which is incorporated herein by reference in its entirety.

The host system 100 may be any computing device, physical server, computer server, desktop, laptop, handheld device, tablet device, smartphone, or any other electronic device suitable for implementing virtualization as described herein. As shown, the system hardware 102 of a host can include at least one computer processing unit (CPU) 104, memory 106 (e.g., random access memory), and storage devices 108 (e.g., hard disk drives). The host system 100 may include additional devices, software modules, and the like, as would be appreciated to one skilled in the art, but are not shown herein so as to not unnecessarily obscure the aspects of the disclosure. As software, the code for the VM 120 will typically execute on the actual system hardware 102.

In some aspects, the CPU 104 may include one or more model-specific registers (MSRs) 105 which are a group of control registers made available for specialized processor functionality, such as virtual-machine extensions, operating-system, and privileged procedures (i.e., instructions executing at a privilege level 0). In case of Intel x86 instruction-set-compatible processors, examples of MSRs 105 include registers associated with the target address of system call handling code, such as IA32_STAR, IA32_LSTAR, IA32_CSTAR, IA32_FMASK for 64-bit modes and IA32_SYSENTER_CS, IA32_SYSENTER_EIP, IA32_SYSENTER_SS, IA32_SYSENTER_ESP for 32-bit modes. MSRs 105 may also be used to save different guest states of different VMs and the host state between context switches during virtualization. The use of MSRs are described in further detail below. While the present disclosure uses MSR-related terminology from the x86 platform, it is understood that other aspects of the present disclosure using other instruction set architectures have other equivalent control processors that may be adapted to the present technique as needed.

In the exemplary aspect, the virtual machine 120 has both virtual system hardware 130 and guest system software, including the guest OS 122. The virtual system hardware 130 can include a virtual CPU 131, virtual memory 132, a virtual disk 134, as well as other virtual hardware components, such as a virtual network interface. It is noted that all of the virtual hardware components of the virtual machine 120 can be implemented in software to emulate corresponding physical components, for example, using a virtual device emulator module. The guest OS 122 may be configured to support execution of one or more guest processes 124. A guest process 124 may be a running instance of program code that is part of a user-level application or guest application.

The VMM 110 acts as the interface between guest software executing within the VM 120, including one or more guest processes 124 and guest OS 122, and the hardware components and devices in the underlying system hardware platform 102 of the host machine. For example, to manage memory during operation of the VM 120, when a user-level guest process 124 requests a page of memory, the guest OS 122 allocates memory in an address space of the guest physical memory 132. The address space of guest physical memory 132 will be mapped to another memory address space of the host physical memory 106 of the system hardware 102. In this regard, the VMM 110 can maintain a paging structure, including one or more page tables or translation tables, such as the exemplary page mapping shown U.S. Pat. No. 7,596,677, the entire contents of which are hereby incorporated by reference. If nested paging technology (e.g., Intel Extended Page Tables (EPT) or AMD Rapid Virtualization Indexing (RVI)) is available on the CPU, the VMM 110 can manage EPT page tables to control guest physical address to host one mappings.

The guest physical memory 132 of the virtual machine 120 is backed by the corresponding host physical memory 106 in system hardware 102. For clarity of discussion, the term "guest physical memory" or "guest OS memory" refers to emulated memory (e.g., virtual memory 132) that is visible to the guest OS 122. The term "guest virtual memory" refers to a virtual address space 133 exposed to guest applications or guest processes 124 and provided by the guest OS 122 as a memory management technique that uses disk storage to extend physical memory. "Host virtual memory" refers to a continuous virtual address space that the host itself may expose to the VMM 110, host OS processes (such as host-side process 112), and/or host operating system 114 of the host using virtual memory techniques. The term "host physical memory" refers to hardware memory or machine memory (e.g., memory 106) that is visible from the perspective of the VMM 110. Portions of the guest virtual memory 133 are ultimately backed by one or more machine memory pages 107 according to memory mapping methodology performed by the VMM 110.

As part of its execution, a guest process 124 may execute one or more system calls. By invoking a system call, the guest process 124 requests a (typically, privileged) service from the kernel of an underlying operating system (in the case of a guest process 124, the guest operating system 122). For example, the guest process 124 may invoke a system call to request services related to file management, such as system calls for creating, deleting, opening, closing, reading, and writing files within virtual disk 134. In another example, the guest process 124 may invoke one or more system call related to memory management, such as calls for allocating or freeing memory from virtual RAM 132. In another example, the guest process 124 may invoke one or more system calls to request services from the guest kernel related to the process control and management, such as system calls for creating, starting, and stopping (guest) processes, and loading libraries; as well as system calls related to network management (e.g., sending and receiving messages).

In general, the guest process 124 makes a system call by writing one or more system call arguments to certain registers (e.g., ebx, ecx, edx, esi, edi, edp) including a system call number (e.g., into the register eax). The guest process 124 then invokes some signal (e.g., interrupt, instruction) that causes a change in privilege level and triggers the kernel to perform some action on behalf of the user process. For example, the guest process 124 may call a software interrupt (e.g., 0x80). In another example, the guest process 124 may use a "fast system call" approach and use a specialized instruction for invoking privileged instruction (e.g., a "SYSCALL" instruction in 64-bit systems, "SYSENTER" instruction in 32-bit systems).

Figure 2:
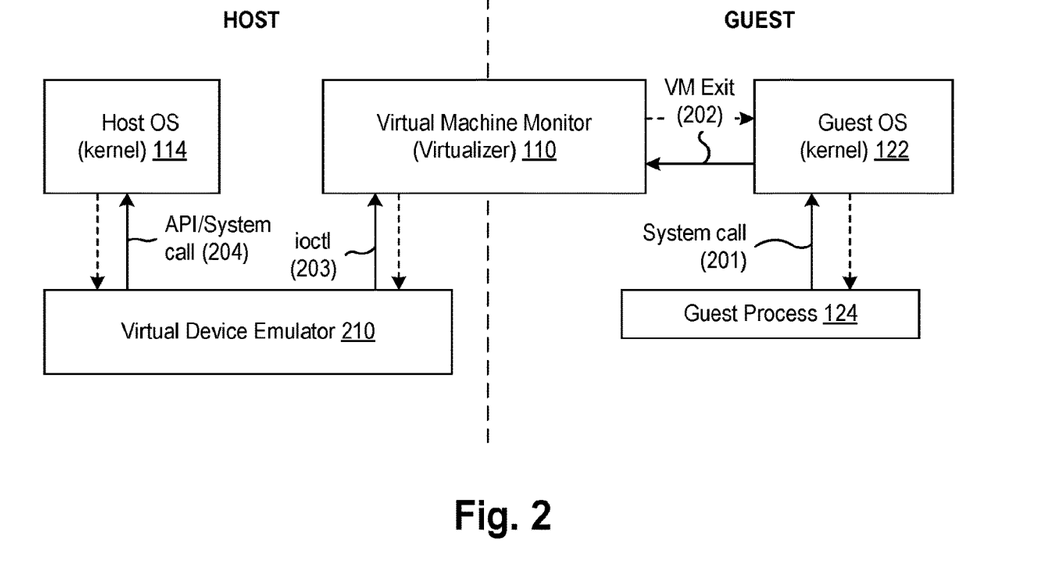
FIG. 2 is a block diagram illustrating an architecture for executing system calls in a virtualized environment.

FIG. 2 is a block diagram illustrating an architecture for executing system calls in a virtualized environment. Virtual device emulation can be divided into two major parts: a VMM part performing emulation of particular virtual hardware (device registers mapped to physical memory region or to I/O ports, functional behavior, virtual interrupt injections on operation completion, etc.); and a host OS process (Virtual Device Emulator 210) or host OS kernel module performing virtual disk storage manipulation by calling host system calls (e.g. read/write virtual blocks from/to file emulating virtual device storage). Virtual Device Emulator 210 executing as a process makes system calls (e.g. ioctl call) to VMM 110 and receives control messages back through return codes and data prepared by VMM.

In the architecture shown, a guest process 124 executing in a virtual machine 120 makes an I/O system call to access the virtual disk 134. The I/O system call causes a transfer of control (201) to the guest OS (kernel) 122. Guest OS kernel 122 and a virtual disk driver performs system call processing such that the driver will access emulated device registers (usually by using Memory-mapped I/O or port I/O instructions). Consequently, a "VM Exit" event occurs in which a transition (202) is made between the VM 120 currently running and the VMM 110, which exercises system control to manage the device access requested by the I/O system call. As part of the VM Exit event, the processor 104 has to save the VM's processor state including information about virtual registers and model-specific registers into a guest state area, and loads the processor state of the VMM 110 based on the host state data.

To handle a virtual device I/O operation as a part of the I/O system call, the VMM 110 may, in turn, make a call to host OS API performing e.g. reads/writes from/to a host file substituting virtual disk storage, device input and output control system call (e.g., "ioctl"), resulting in a switch (203) to the host OS (kernel) 114. The ioctl call exit (represented by the dashed arrow) may specify a control code number representing a request for virtual disk access. Based on that control code, the host kernel 114 then switches (204) to a virtual device emulator 210 configured to implement the appropriate virtual device logic. After the virtual device access request is handled, control may be return to the originating guest process, represented by the dashed arrows in FIG. 2. Accordingly, the approach to handling such I/O operations via system calls in a virtualized environment is slow and costly with resources because each of the control transfers (201, 202, 203, 204) and control returns require a corresponding context switch.

Figure 3:
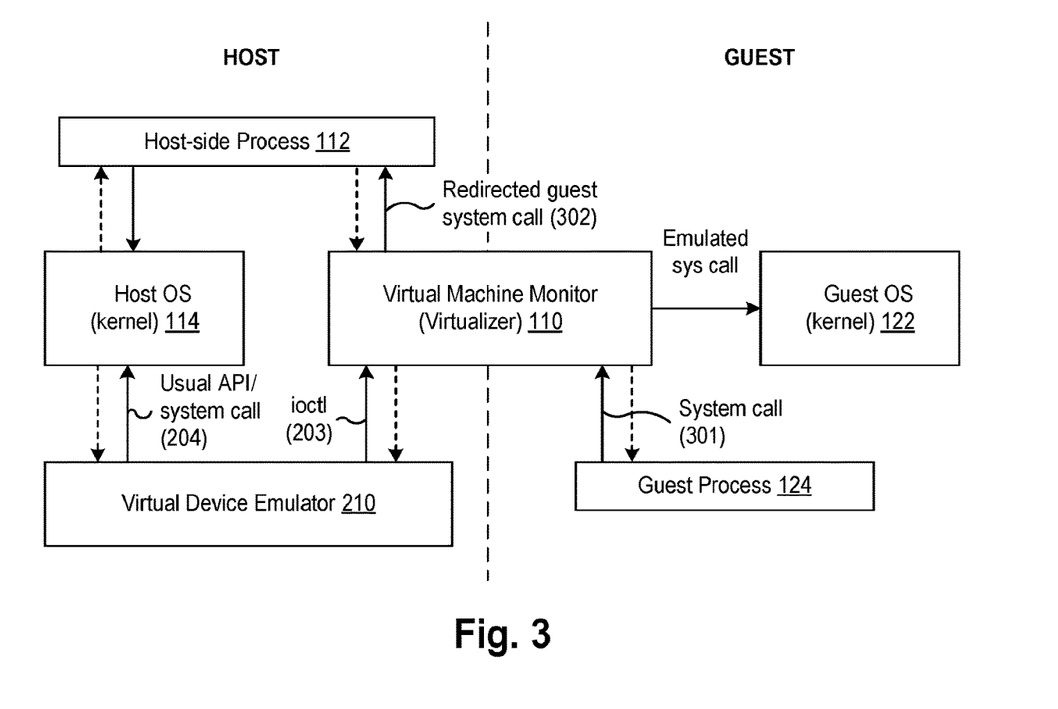
FIG. 3 is a block diagram illustrating an architecture for executing system calls in a virtualized environment, according to an exemplary aspect.

FIG. 3 is a block diagram illustrating an architecture for executing system calls in a virtualized environment, according to an exemplary aspect. In contrast to the approach described in FIG. 2, processes on the host side and the guest side share memory, system calls are controlled by the VMM 110, and the VMM 110 decides on which side to run process code.

In the architecture shown, the VMM 110 may be configured to execute the guest program on the host side as a host-side process 112 and route one or more performance-critical system calls directly to the host side to be run by the host kernel 114. The VMM 110 may trap a system call (301) from the guest process 124, determine that the system call is suitable for routing directly to the host kernel 114, and route the system call accordingly (302). Otherwise, the VMM 110 may route the system call through the full virtualization stack as described in the approach shown in FIG. 2 (i.e., via the guest OS, the VMM, the host OS, and the virtual device emulator 210), and continue execution from the guest kernel's system call entry point. After that, the VMM 110 may continue to execute the program on the guest side, and may eventually switch back to execution on the host side depending on a particular workload. For example, the VMM 110 may redirect some open, close, read, write system calls for some file paths and handles to the host OS. VMM 110, by emulating SYSCALL instruction, analyzes the input data placed into registers (and may be referenced guest data structures), decides whether this concrete system call has to be routed to host-side or not, and performs emulation in accordance with the taken decision by redirecting system call to host OS side or by jumping to the guest system call handler like described above.

In an aspect, in case of routing system calls to the host OS-side (302), all processing can be performed by the host OS kernel 114. In some situations, data structures may need to be converted (e.g., for data compatibility reasons), which may be done in the VMM 110 as system call post-processing routines. It is noted that it may be necessary to skip the original guest system call handler because it is already processed on the host side (because the host SYSCALL puts all necessary data in memory and general-purpose registers). Otherwise, if unable to route the system call to the host OS, the VMM "emulates" the processor instruction SYSCALL by loading several registers to guest values defined by the guest OS 122 in, for example, IA32_xSTAR MSRs. In some aspects, routed system calls after execution in the host have to skip guest OS system call handler code, and load particular/selective general purpose registers values (at least several which are sensitive for system call result) saved after an execution in context of host side process 112 (host values of RIP and RSP are ignored, guest RIP and RSP are loaded in accordance with guest SYSRET or SYSEXIT values.)

To facilitate the described approach to executing system calls, the VMM 110 may be configured to maintain a copy of guest program address space on the host side, and manage the underlying physical memory pages such that state changes of a program (124) on the guest side are reflected on the host side, and vice versa. In one aspect, the VMM 110 is configured to execute a guest process 124 within a virtual machine 120 which has an associated guest-process virtual address space. The VMM 110 may be further configured to execute, on a host, a host process 112 corresponding to the guest process 124 and having an associated host-process virtual address space. The VMM 110 is configured to map the host-process virtual address space and the guest-process virtual address space to a same host physical memory.

In some aspects, the VMM 110 may be configured to maintain process mappings on the host-side and the guest-side in a consistent manner (i.e., changes on either side are reflected on the other) by intercepting memory allocation or memory mapping guest system calls and making the same change on the host process 112 side. An example of a memory mapping guest system call may be a mmap( ) system call that can add a new memory mapping to a guest process's page tables. Another example of a memory allocation guest system call may be a malloc( ) system called configured to request additional guest virtual memory for the guest process. The host OS process 112, where the intercepted system call is passed to, maintains the same guest process mappings such that the host process mappings point to the same guest pages, which are allocated by the VMM 110 to represent guest OS memory. This mapping enables the ability to switch execution from interrupted guest OS process 124 to the host process 112 (to execute system calls in another context) and back dynamically at any time. Such context switches according to certain aspects are resource-inexpensive because the switches will not require memory copy (all process data is shared).

The VMM 110 may be configured to trap a system call invoked by the guest process 124. In some aspects, an OS kernel is configured to receive incoming system calls by writing, in a designated model-specific register 105, the address of system-call-handling program code that will execute when a system call. In one aspect, the VMM 110 may trap the system call made by a guest process 124 by first protecting those registers 105 from access (e.g., read/write) operations and loading certain values to the registers 105. The certain values may be "invalid" values, zero values, or other values selected to cause an exception or trigger an event in the processor. Each guest system call executing a SYSCALL instructions will generate an exception and the VMM 110 may recognize that particular exception as an emulated system call.

For example, for Intel IA-32/IA-32e processors if the guest OS 122 is running in hardware virtualized non-root mode (Intel VMX de-privileged mode for executing isolated guest kernel and user code), there is an MSR interception-enabling mechanism (e.g., VMCS_CTRL_MSR_BITMAPS VMCS field) pointing to a bit mask region allowing or disallowing native execution of the particular MSR. For 64-bit modes (including 32-bit compatibility mode), native access to IA32_STAR, IA32_LSTAR, IA32_CSTAR, IA32_FMASK MSRs may be disabled by corresponding bits in the MSR bitmask region, such that guest accesses to these MSRs will cause VMEXIT events. In this example and in the software virtualization mode, values of these MSRs can be loaded with zeros to make them "invalid" and cause an exception. Another way to make SYSCALL non-executable is by setting an extended feature enable register (EFER)

(e.g., IA32_EFER MSR) system call extensions (SCE) bit to zero. In one implementation for SYSCALL-based system calls, this may be expressed using the pseudocode: IF (IA32_EFER.SCE≠1) THEN #UD; FI. For 32-bit modes, native execution of SYSENTER instruction can be prevented in the same manner by zeroing MSRs 105 corresponding to the SYSENTER instruction, such as a code segment selector MSR (IA32_SYSENTER_CS), an instruction pointer register (IA32_SYSENTER_EIP), a stack segment register (IA32_SYSENTER_SS), and a stack pointer MSR (IA32_SYSENTER_ESP). In one implementation, for SYSENTER-based system calls, this may be expressed by the pseudocode: IF IA32_SYSENTER_CS[15:2]=0 THEN #GP(0); FI.

In one exemplary aspect for "fast system call" handling in an Intel 64-bit x86-based platform, a guest process 124 may execute a "SYSCALL" instruction configured to perform a switch from user to kernel privilege levels (e.g., privilege level 3 to privilege level 0). To handle such SYSCALL instructions, the guest OS 122 sets values in certain MSRs 105 that are designated as system-call target-address registers. For example, the guest OS 122 may register the program code that will execute when a system call occurs by writing the address of the program code to the IA32_STAR MSR, the IA32_LSTAR MSR, the IA32_CSTAR MSR, or other MSRs 105. In some aspects, the VMM 110 may be configured to protect the MSRs 105 from read and/or write access and to load its invalid values to the MSRs 105. Subsequently, for IA-32e 64-bit guest OSes, when a guest process 124 makes a system call, the processor checks IA32_EFER.SCE bit settings, determines that it is zero (i.e. SYSCALL instruction is disallowed), and generates an undefined opcode exception (#UD). In some aspects, for 64-bit guests, the VMM configures the VMCS to raise a VMEXIT event on guest #UD exceptions and/or #GP exceptions, for example, by modifying an exception bitmap field in the VMCS that contains one bit for each type of possible exception. When an exception occurs, its vector is used to select a bit in this field. If the bit is 1, the corresponding exception causes a VMEXIT. In this case, the VMM configures the VMCS to mask bits in the exception bitmap field corresponding to the guest #UD exception (for a SYSCALL interception) and the #GP exception (for a SYSENTER interception) to generate VMEXIT events. As such, the VMM 110 gets control and proceeds to perform SYSCALL instruction emulation. For IA-32 32-bit guest OSes 122, when a guest process 124 makes a system call by using SYSENTER instruction, the processor verifies upcoming segment register CS value in IA32_SYSENTER_CS (bits from 2 to 15). If these bits point to zero selector, the processor generates a general protection fault exception (i.e., "#GP") due to invalid settings of target code segment selector value in the MSRs 105. In some aspects, for 32-bit guest OSes 122, the VMM 110 is configured to catch the #GP exception to process the system call as described herein. For example, the VMM 110 may extract the system call number and its arguments, and use the extracted data to direct the system call to a host-side process 112. In another aspect, the VMM 110 may be configured to trap system calls made by guest processes using a software interrupt (i.e., 0x80), which may involve disabling any configurations that allow system calls to bypass the VMM.

It is understood that the described aspects may be extended to other processor platforms. For example, in an ARM-based architecture, the VMM 110 may be configured to trap system calls using a SVC (supervisor) instruction or SWI (software interrupt) instructions for executing privileged commands. It is noted that abovementioned approaches do not require modifications of the guest application or guest program code itself. Other approaches involving changes to the guest program code may also be used, such as the use of process tracing (e.g., ptrace) or modifying the syscall table to replace system call handlers with custom wrappers that are configured to direct system calls to the host-side process 112.

In one aspect, the VMM 110 may be configured to determine whether to perform the trapped system call using the guest process 124 or the host process 112 based on a number of criteria. In some aspects, the VMM 110 may determine whether to use the guest process 124 to perform the trapped system call based on based on a type of the trapped system call. For example, file access system calls can be handled in this way. In some aspects, responsive to determining that the trapped system call is an I/O-related system call, the VMM 110 may determine that the host process 112 is the appropriate location for executing the trapped system call. Examples of I/O-related system calls include open( ) close( ) read( ) write( ) and lseek( ) in Unix-based systems, or CreateFile( ) ReadFile( ) WriteFile( ) CloseHandle( ) in Windows-based systems. In some implementations, the VMM 110 may compare the system call number extracted from the trapped system call that identifies the requested system call with a list of pre-determined system calls mapped to the host-side process. If no match is found, the VMM 110 may default to determining that the trapped system call is to be executed on the guest-side.

In one aspect, the VMM 110 may be configured to perform the trapped system call using the host process 112. State changes in the host-process virtual address space caused by the trapped system call are reflected in the guest-process virtual address space. In one aspect, the VMM 110 is configured to resume execution of the guest process 124 in response to completing execution of the trapped system call.

As part of the execution of the system call, particular system calls can access or reference data located in guest memory. For example, a write(fd, buf, size) system call that requests a number of bytes (size) from a buffer pointed to by an address (buf) be written to a file referred to be a file descriptor (fd). In some aspects, to perform the write operation, the system call would have to access the data stored at the buffer address, which points to a location within guest memory. To avoid excessive copying of host RAM, the VMM 110 may be configured to use memory mapping host API to map guest (virtual) pages to the context of the host process 112. As discussed earlier, in one example, the VMM 110 may use a mmap( ) system call that can add a new memory mapping to a guest process's page tables to map the guest pages to the context of the host process 112. In another example, the VMM 110 may use a memory allocation guest system call such as malloc( ) to request additional guest virtual memory for the guest process and map the guest pages to the context of the host process 112. The host OS process 112, where the intercepted system call is passed to, maintains the same guest process mappings such that the host process mappings point to the same guest pages, which are allocated by the VMM 110 to represent guest OS memory.

In an aspect, the handling of guest-process memory mappings by catching guest process memory management system calls as described earlier can help to build a complete guest process memory view in the context of the host process. A hint may be made to the VMM about the guest page regions' appearance and removal. Independently, when handling the memory management system calls, the VMM may make a decision about whether to create or not create mappings of the guest process region in accordance with guest system calls redirected to the host process. In a best case, the guest process memory region can be mapped to the same virtual addresses of the host context. But it is possible if there is no intersection with already allocated host process regions. If the guest address intersects with already allocated host regions, the guest memory region can be mapped to another base address, but in this case, a host system call can manipulate memory guest structures used in the system call but without additional references to nested or depended guest data located within intersected regions. Different operating systems may have OS-dependent APIs to create mappings on specific address. For example, in a POSIX-compatible system, to map guest pages to user space regions, mmap( ) function can be used (optionally in cooperation with an open( ) system call to open a file and return a file descriptor or a shm_open( ) system call to establish a connection between a shared memory object and a file descriptor). Two different approaches for mapping guest pages to the context of the host process are described in conjunction with FIGS. 4A and 4B below.

Figure 4A:
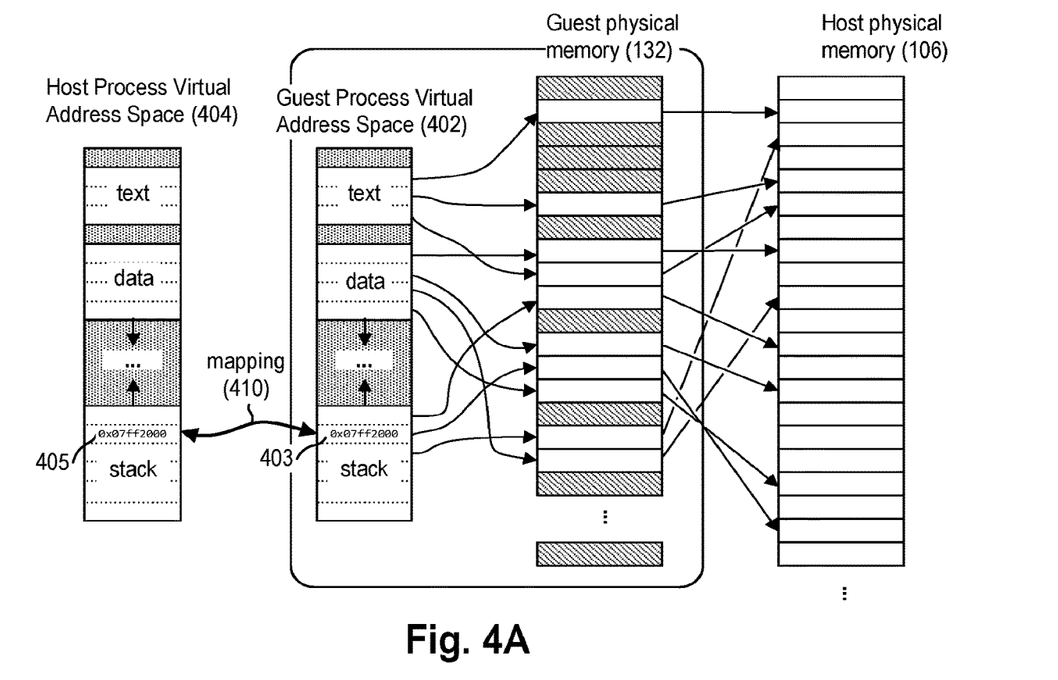
FIG. 4A is a block diagram illustrating one approach to mapping memory between a guest process and a host process according to an exemplary aspect.

FIG. 4A is a block diagram illustrating one approach to mapping memory between a guest process and a host process according to an exemplary aspect. The guest kernel makes available a virtual address space 402 for the guest process 124 as a logically contiguous range of virtual addresses, which can include a segment for text (i.e., code segment), a segment for data, a heap area, and a stack area. The guest kernel maps the guest virtual address space 402 to guest physical memory 132 (and some combination of secondary storage). The VMM 110 manages the address translation between the guest physical memory 132 and the host physical memory 106, for example, using a physical memory mapping data structure, or a shadow page table (not shown). Discussion of the page tables and/or shadow page tables for translating memory address for VMs is omitted for clarity of explanation.

As described above, the VMM 110 maintains a corresponding virtual address space 404 for the host-side process 112 that corresponds to the guest process. In some aspects, the VMM 110 maps at least portions of the host-process virtual address space 404 and the guest-process virtual address space 402 to a same host physical memory. For example, a guest page found at virtual address 0x07ff2000 within the guest-process virtual address space 402 and a corresponding memory page (at 0x07ff2000) within the host-process virtual address space 404 may be backed by the same page frame within host physical memory 106.

According to one aspect, the VMM 110 may perform a mapping procedure that maps guest page to the same virtual address like the guest OS maps the page to the virtual space of guest process executing the system call. In some aspects, the VMM 110 generates a mapping 401 that maps a guest page 403 to the same virtual address as the page 405. As a result, when executing a system call that accesses or references guest data via a guest data pointer (e.g., passed as an argument to the system call), the guest data pointer passed to system call remains consistent in context of host OS process 112. For example, the VMM 110 may trap a system call for a write operation includes a reference to a buffer within guest memory as one of the system call parameters: "write (fd, 0x00f13570, 10 bytes)." In this case, the resultant translated system call may use the same guest data pointer because the address is still correct even in the context of the host-side virtual address space.

Furthermore, in aspects where the VMM 110 maps (in this manner) all guest pages used from translated system calls, there is no issue with chained (i.e., nested) data references from the system call running on the host side. Rather, compatibility with chained data references can be achieved by using lazy mapping (on-demand mapping) of guest-process pages to the host-process virtual address space 404. Initially, the VMM 110 may protect the full host-process virtual address space region potentially referenced by translated guest OS system calls. In one implementation, the VMM 110 may use the system call mprotect( ) configured to changes an access protection for memory pages contained in the host-process virtual address space 404. All attempts to access the protected area from translate system calls will cause the kernel to generate a protection fault (e.g., SIGSEGV signal on a Linux-based system) which will rise. The system may include a fault handler (signal handler) configured to map a new guest page to the accessed address and release protection from the accessed address, for example, using the munprotect( ) system call. The interrupted system call is resumed from the interrupted address and continues execution.

Figure 4B:
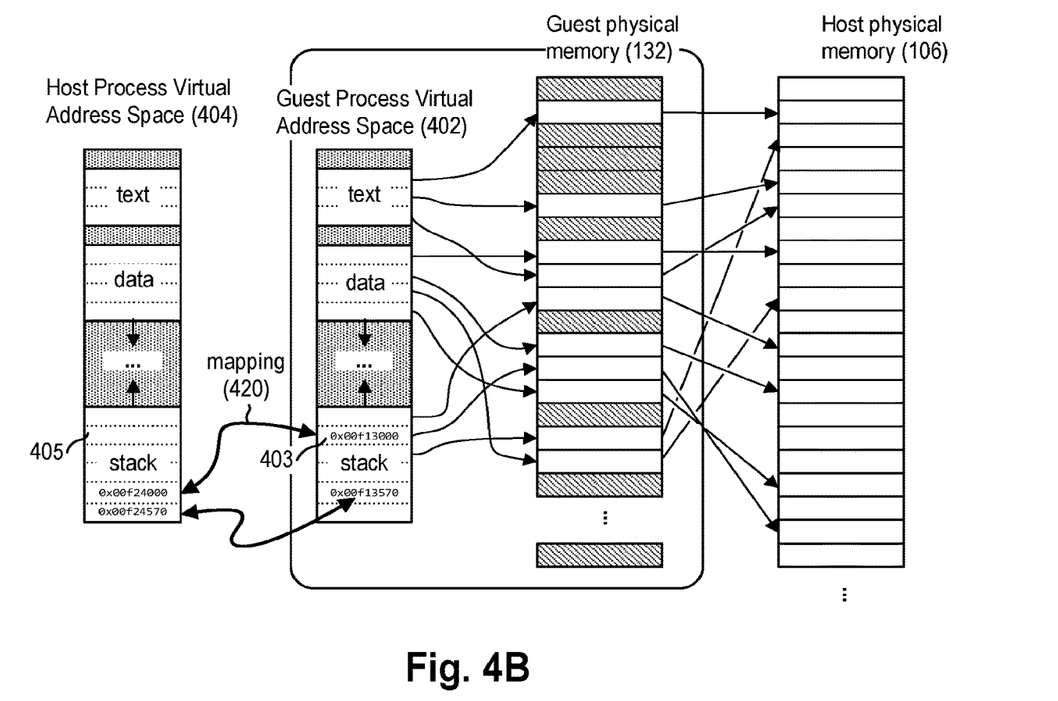
FIG. 4B is a block diagram illustrating another approach to mapping memory between a guest process and a host process according to another exemplary aspect.

FIG. 4B is a block diagram illustrating another approach to mapping memory between a guest process and a host process according to another exemplary aspect. The depicted architecture includes a host-process address space 404 associated with a guest-process virtual address space 402 (similar to that depicted in FIG. 4A). In one aspect, the VMM 110 is configured to use the original guest mappings to map a guest page to another (random) virtual address of the host-process virtual address space 404 (420). This approach may work with a limited number of system calls because the referenced system call data structure may not have additional pointers to guest memory buffers (these pointers will not be relocated and will point to guest address thus host system call can't read or write derived data structures). For example, a guest page located at the address 0x00f13000 may be mapped to a virtual address 0x00f24000 in the host-process virtual address space 404. In this case, when executing a system call that accesses or references guest data via a guest data pointer (e.g., passed as an argument to the system call), the VMM 110 substitutes the data reference pointer with the new host pointer. For example, when the VMM 110 traps a write system call that involves accessing some portion of guest memory (e.g., "write(fd, 0x00f13570, 10 bytes)"), the VMM 110 generates a translated system call with a substituted data reference pointer: write(fd, 0x00f24570, 10 bytes)

Aspects of the present disclosure may be extended to distributed computing systems for distributed system-call execution, where a copy of a "guest" process is created on a remote host. In such aspects, the described system-call handling mechanism works in a similar manner as in the local host solution described earlier except that the system call is transferred to the remote host by a network connection. An exemplary aspect of a distributed system for remote system-call execution is described in conjunction with FIG. 5 below.

Figure 5:
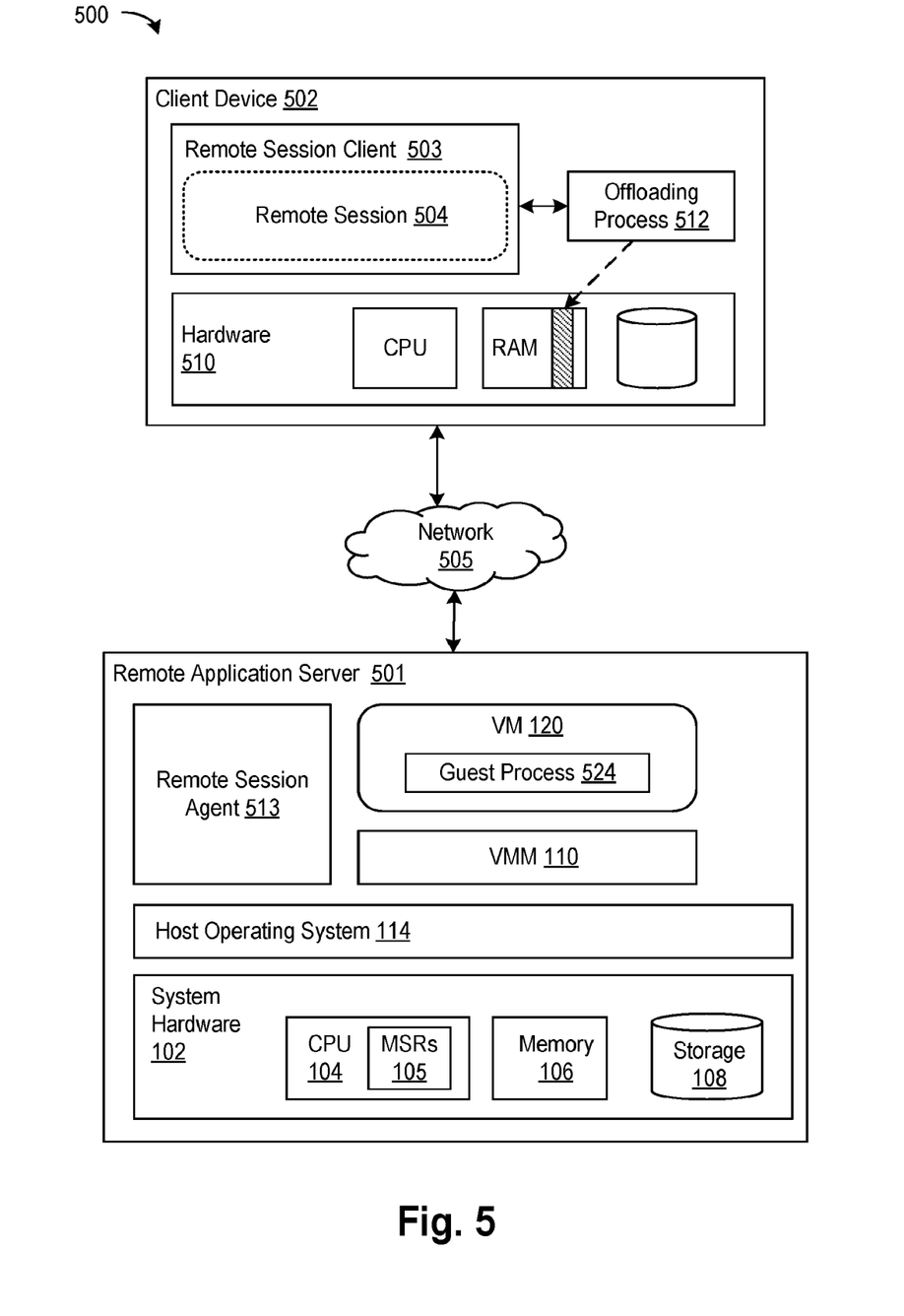
FIG. 5 is a block diagram illustrating a distributed system for executing remote system calls in a virtualized environment, according to an exemplary aspect.

FIG. 5 is a block diagram illustrating a distributed system 500 for executing system calls in a virtualized environment, according to an exemplary aspect. The distributed system 500 includes a client device 502 communicatively connected to a remote application server 501 via a network 505. The client device 502 may include computer hardware 510 similar to the system hardware 102 of a host system 100. As described in greater detail below, the system 500 may be configured to selectively offload and execute system calls similar to the system 100, except that the "host-side" components may be extended to an additional computational platform, namely, the client device 502. In this way, the client device 502 can be considered part of the "host-side", and the virtual execution environment (VEE) remains the "guest-side" of the described system. The client device 502 includes a remote session client 503 configured to perform analogous operations of the aforementioned algorithms and techniques.

The network connection between the client device 502 and the remote application server 501 may be a network socket, or other more complex communication channel. In some aspects, the network 505 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In one aspect, the remote session client 503 executing on the client device 502 is configured to establish a remote session 504 with a remote session agent 513 executing on the remote server 501. The remote session 504 established between the remote session client 503 and the remote application server 501 may be configured to provide access at the client device 502 to one or more applications that might not be otherwise available or installed locally on the client device 502. In one aspect, the remote session client 503 may be a remote application server (RAS) agent configured to remotely provide instances of software applications to the client device 502. The remote application server 501 may be a virtual application and desktop delivery system that allows users to access and use applications and data from any device, such as the client device 502.

In some aspects, the remote session client 503 is a software application that establishes the remote session 504 as a connection to a new instance of a virtual desktop (e.g., a virtual machine) spawned by the remote application server 501 specifically for a remote session 504, and that allows access to a user's data and applications (e.g., via a roaming profile). An example of a remote application server client application may be a Parallels® Remote Application Server™ (RAS) Client. In other aspects, the remote session client 503 may be a remote access application that establishes the remote session 504 as a remote desktop connection to a specific computing device (having the remote session agent 513 executing thereon), such as the user's desktop at their office, server, or virtual machine. Example of remote access applications include Parallels Access® (formerly Parallels Mobile), Apple Remote Desktop™, Citrix GoToMyPC®, and Virtual Network Computing (VNC®). In some aspects, the remote session agent 513 may provide a virtual desktop environment, sometimes referred to as a virtual desktop infrastructure (VDI) for executing applications and accessing data (e.g., private files). In some aspects, the remote session 504 may be implemented using a remote desktop protocol, such as Remote Desktop Protocol (RDP), Virtual Network Computing (VNC), or Personal Computer over Internet Protocol (PCoIP).

In some aspects, the remote session client 503 may be configured to process trapped system calls from a guest process 524 running inside VM 120 under VMM 110 control. The remote session 504 providing an access to a remote application (guest process 524) or virtual desktop may handle redirected system calls from the remote server's VMM 110. The VMM 110 identifies "heavy" system calls and redirects offloaded system calls to the client device 502 over network 505. The client device's remote session client 503 starts an additional process 512 (analogous to the host-side process 112 of system 100) for system call execution, allocates buffers to store system call data, does mmap operations for copied offloaded system call data either to the same guest addresses (in accordance with FIG. 4A schema) or to an another ones (as described in FIG. 4B). In one aspect, the system 500 may also have a host-side process executing on the remote application server 501 (similar to the host-side process 112), and the system 500 may be configured to selectively pass system calls, data, and memory associated with the call to either the remote client device 502, or the host-side process 112.

In this case, a part of "guest" process 524 load will be mapped to the client device 502. The ability of RAS system-call offloading can be useful for system calls that take lengthy period of time to complete, or to access some local resources of the client device 502. For example, open, write, close operations for files located on the client device 502 and for delivery of read/write results to the host may redirected to a client-side process 512 executing on the client device 502. Thus, an implicit mapping of full or partial client-side file system can be performed to the virtual machine 120 running on the remote server 501.

Unlike in the local host aspect, host memory pages cannot be shared (with addresses and pointers) for read/write between "guest" and host contexts. In some aspects, the remote session client 503 may be configured to copy, to the remote application server 501 over the network 505, memory pages on-demand each time a page is accessed by the translated system call execution. Before the page-copy is performed, the memory page is protected from modification by the virtualizer. When the translated system call is finished, all accessed memory pages are copied back to the "guest" system, then the memory pages are marked as unprotected.

According to another aspect of the present disclosure, the described technique can be applied to a system (e.g., systems 100, 500) and used to offload system calls that do not have references to memory buffers and pass system call arguments in registers. As such, the described technique may be used to pass data through emulated guest registers and needs not use guest memory. For example, the described technique can be applied to Linux system calls working on Intel-64-compatible processors, which pass arguments in following registers: RAX—system call number, RCX—return address, RDI—system call argument 0, RSI—argument 1, RDX—argument 2, R10—argument 3, R8—argument 4, R9—argument 5. That is, the guest process running in an Intel-64 Long mode context will put the corresponding system call number and arguments to general purpose registers listed above. For example, if the guest process executes a sync( ) system call having zero arguments, the guest process places a value "162" corresponding to sync( )'s system call number to the RAX register and executes SYSCALL instruction. The sync( ) system call is being executed when the process wants to flush filesystem caches to a physical storage. Aspects of the present disclosure intercepts the SYSCALL instruction execution, identifies sync( ) system call by detecting value 162 in RAX register, and bypasses it to the host OS kernel. Because the system call does not have arguments, aspects do not need to create additional mappings in this case. This example demonstrates how aspects of the present disclosure can be used with system calls which do not have arguments referencing memory.

Figure 6:
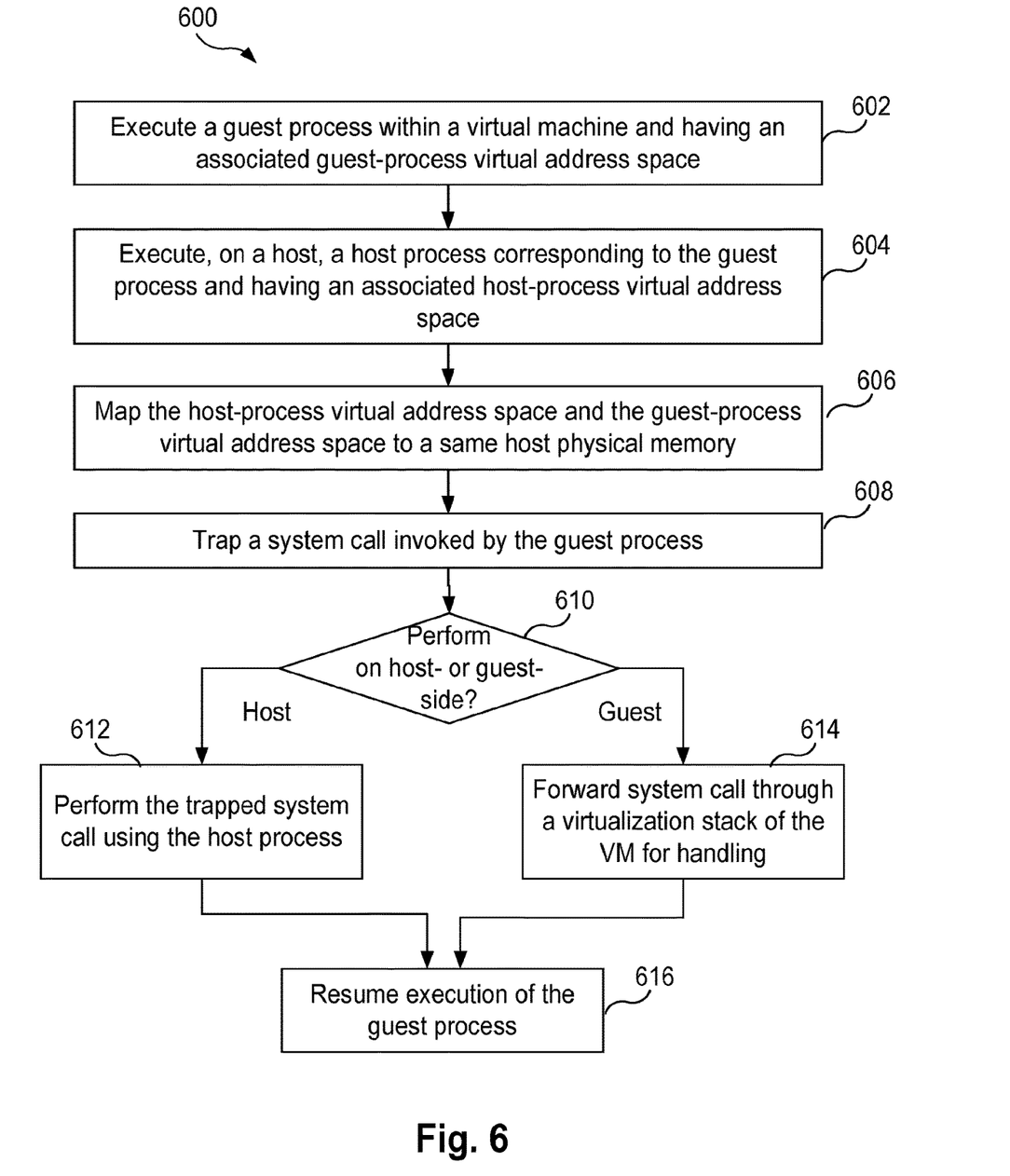
FIG. 6 is a flowchart illustrating a method for executing system calls in a virtualized environment, according to an exemplary aspect.

FIG. 6 is a flowchart illustrating a method 600 for executing system calls in a virtualized environment according to an exemplary aspect. It is noted that the following description of the exemplary method makes reference to the system and components described above.

The method 600 begins at step 602, in which the VMM 110 executes a guest process 124 within a virtual machine 120 and having an associated guest-process virtual address space. At step 604, the VMM 110 executes, on a host 100, a host process 112 corresponding to the guest process and having an associated host-process virtual address space.

At step 606, the VMM 110 maps the host-process virtual address space and the guest-process virtual address space to a same host physical memory 106. In some aspects, the VMM 110 may intercept a memory-management system call to modify a memory mapping of the guest-process virtual address space, and perform the change on both the guest-process virtual address space and the host-process virtual address space. In some aspects, the VMM 110 may invoke a memory mapping API call to map at least a portion of a guest virtual address space range to a context of the host process. In some aspects, the VMM 110 may invoke the memory mapping API call to map at least a portion of a guest virtual page to a context of the host process. In other aspects, the VMM 110 may invoke the memory mapping API call to map at least a portion of a guest virtual address space range, such as one or more guest virtual pages, to a context of the host process.

At step 608, the VMM 110 traps a system call invoked by the guest process. In some aspects, the VMM 110 may protect a model-specific register 105 associated with a system-call target address from read or write access. Then, the VMM 110 may catch a general protection exception caused by the guest process attempting to read the protected model-specific register associated with the system-call target address. In some aspects, the VMM 110 may determine that the general protection exception is associated with an emulated system call, and extract a system call number and one or more system-call arguments associated with the trapped system call.

At step 610, the VMM 110 determines whether to perform the trapped system call using the guest process or the host process based on a type of the trapped system call. In some aspects, the VMM 110 may determine to perform the trapped system call based on a determination that the trapped system call is related to file-management or device-management operations (e.g., write, read, open, close files).

At step 612, responsive to determining that the trapped system call is suitable for the host process, the VMM 110 performs the trapped system call using the host process. State changes in the host-process virtual address space caused by the trapped system call are reflected in the guest-process virtual address space. In some aspects, the VMM 110 may have modified the access protection of the host-process virtual address space to protect the host-process virtual address space from access. Subsequently, during execution of the system call, and in response to a protection fault caused by the system call attempting to access a portion of the host-process virtual address space, the VMM 110 may map a new guest page to the accessed portion and release protection of the accessed portion, e.g., according to on-demand paging techniques. In one aspect, the VMM 110 may generate a translated system call based on the trapped system call. In some aspects, responsive to determining that the trapped system call includes a guest data pointer referencing a portion of the guest-process virtual address space, the VMM 110 may substitute the guest data pointer with a host data pointer referencing the same portion of the guest-process virtual address space as part of translating the system call. At step 616, the VMM 110 resumes execution of the guest process in response to completing execution of the trapped system call.

At step 614, responsive to determining that the trapped system call is suitable for the guest process, the VMM 110 may forward the trapped system call through a virtualization stack of the virtual machine for handling. The execution of the system call may then proceed, for example, as described in conjunction with FIG. 2 above.

In general, the term "module" as used herein can refer to a software service or application executed as part of the guest operating system 122 or the VMM 110. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

Figure 7:
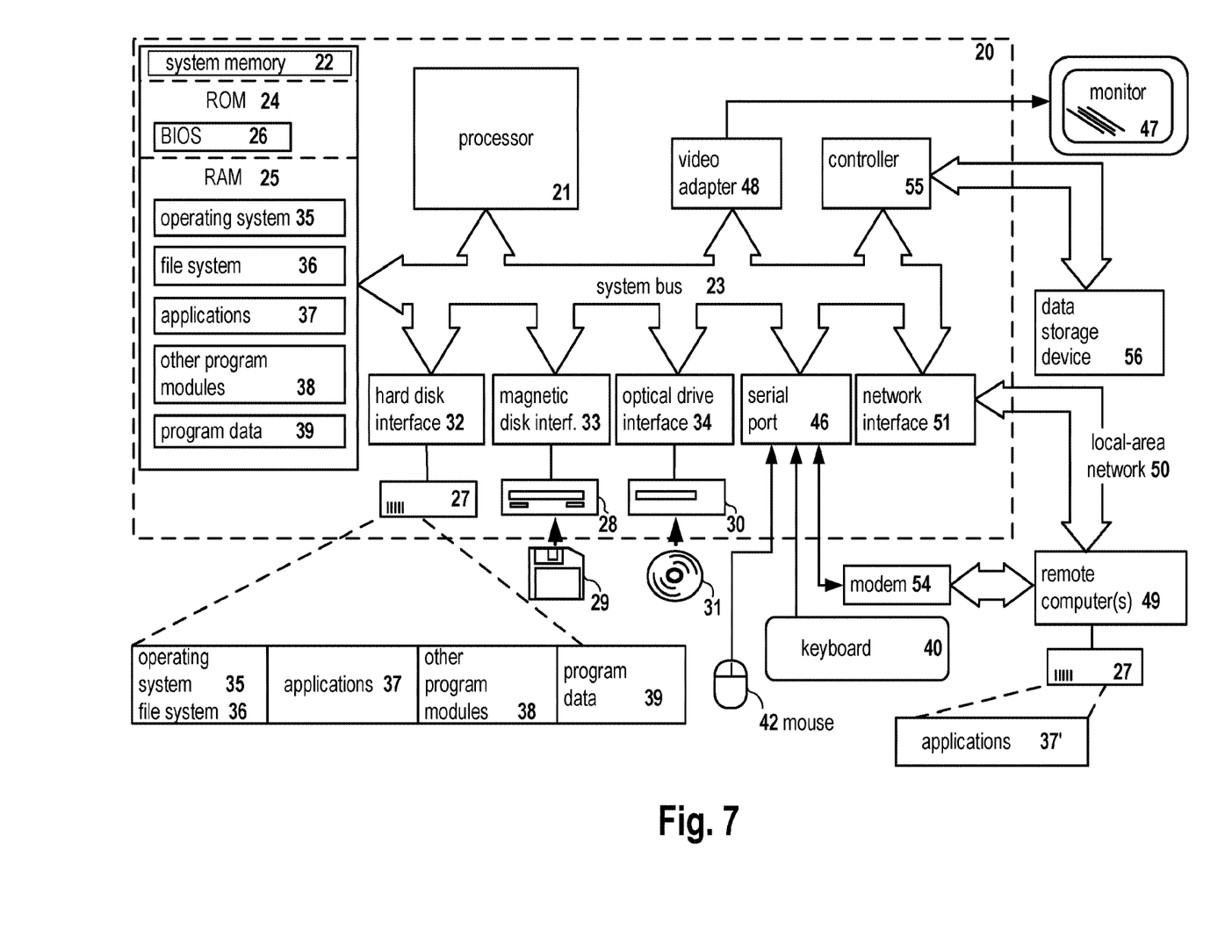
FIG. 7 is a block diagram of a general-purpose computer system on which the disclosed system and method can be implemented according to an exemplary aspect.

FIG. 7 is a block diagram illustrating a general-purpose computer system 20 on which aspects of systems and methods for executing system calls in a virtualized environment may be implemented in accordance with an exemplary aspect. It should be noted that the computer system 20 can correspond to the host system 100, client device 502, remote server 501, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for executing system calls in a virtualized environment, wherein the method comprises:
    executing, on a host, a host process corresponding to a guest process executing within a virtual machine and having an associated guest-process virtual address space, the host process having an associated host-process virtual address space;
    mapping the host-process virtual address space and the guest-process virtual address space to a host physical memory;
    trapping a system call invoked by the guest process;

performing the trapped system call using the host process, wherein state changes in the host-process virtual address space caused by the trapped system call are reflected in the guest-process virtual address space; and causing execution of the guest process to be resumed after performing the trapped system call.

2. The method of claim 1, wherein trapping the system call invoked by the guest process further comprises:

protecting a model-specific register associated with a system-call target address from at least one of read access or write access; and catching a general protection exception caused by the guest process attempting to read the protected model-specific register associated with the system-call target address.

3. The method of claim 2, further comprising:

responsive to determining the general protection exception is associated with an emulated system call, extracting a system call number and one or more system-call arguments associated with the trapped system call.

4. The method of claim 1, wherein mapping the host-process virtual address space and the guest-process virtual address space to the host physical memory further comprises:

intercepting a memory-management system call to modify a memory mapping of the guest-process virtual address space; and performing the modification of the memory mapping on both the guest-process virtual address space and the host-process virtual address space.

5. The method of claim 1, wherein mapping the host-process virtual address space and the guest-process virtual address space to the host physical memory further comprises:

invoking a memory mapping application programming interface (API) call to map at least a portion of a guest virtual address space range to a context of the host process.

6. The method of claim 1, wherein performing the trapped system call using the host process further comprises:

modifying access protection of the host-process virtual address space to protect the host-process virtual address space from access; and in responsive to a protection fault caused by the system call attempting to access a portion of the host-process virtual address space, mapping a new guest page to the accessed portion and release protection of the accessed portion.

7. The method of claim 1, wherein performing the trapped system call using the host process further comprises:

responsive to determining that the trapped system call includes a guest data pointer referencing a portion of the guest-process virtual address space, substituting the guest data pointer with a host data pointer referencing the same portion of the guest-process virtual address space.

8. The method of claim 1, further comprising:

responsive to determining that the trapped system call is suitable for the guest process, forwarding the trapped system call through a virtualization stack of the virtual machine for handling.

9. A system for executing system calls in a virtualized environment, wherein the system comprises:

a physical memory device; and a processor configured to:

execute a host process corresponding to a guest process executing within a virtual machine and having an associated guest-process virtual address space, the host process having an associated host-process virtual address space;

map the host-process virtual address space and the guest-process virtual address space to a host physical memory;

trap a system call invoked by the guest process;

perform the trapped system call using the host process, wherein state changes in the host-process virtual address space caused by the trapped system call are reflected in the guest-process virtual address space; and cause execution of the guest process to be resumed after performing the trapped system call.

10. The system of claim 9, wherein to trap the system call invoked by the guest process is further, the processor is further configured to:

protect a model-specific register associated with a system-call target address from at least one of read access and write access; and catch a general protection exception caused by the guest process attempting to read the protected model-specific register associated with the system-call target address.

11. The system of claim 10, wherein the processor is further configured to:

responsive to determining the general protection exception is associated with an emulated system call, extract a system call number and one or more system-call arguments associated with the trapped system call.

12. The system of claim 9, wherein to map the host-process virtual address space and the guest-process virtual address space to the host physical memory, the processor is further configured to:

intercept a memory-management system call to modify a memory mapping of the guest-process virtual address space; and perform the modification of the memory mapping on both the guest-process virtual address space and the host-process virtual address space.

13. The system of claim 9, wherein to map the host-process virtual address space and the guest-process virtual address space to the host physical memory, the processor is further configured to:

invoke a memory mapping API call to map at least a portion of a guest virtual address space range to a context of the host process.

14. The system of claim 9, wherein to perform the trapped system call using the host process, the processor is further configured to:

modify access protection of the host-process virtual address space to protect the host-process virtual address space from access; and in responsive to a protection fault caused by the system call attempting to access a portion of the host-process virtual address space, map a new guest page to the accessed portion and release protection of the accessed portion.

15. The system of claim 9, wherein to perform the trapped system call using the host process, the processor is further configured to:

responsive to determining that the trapped system call includes a guest data pointer referencing a portion of the guest-process virtual address space, substitute the guest data pointer with a host data pointer referencing the same portion of the guest-process virtual address space.

16. The system of claim 9, wherein the processor is further configured to:
responsive to determining that the trapped system call is suitable for the guest process, forward the trapped system call through a virtualization stack of the virtual machine for handling.

17. A non-transitory computer readable medium comprising computer executable instructions, which when executed by a processor, cause the processor to perform operations to execute system calls in a virtualized environment, the operations comprising:
executing, on a host, a host process corresponding to a guest process executing within a virtual machine and having an associated guest-process virtual address space, the host process having an associated host-process virtual address space;
mapping the host-process virtual address space and the guest-process virtual address space to a host physical memory;
trapping a system call invoked by the guest process;
performing the trapped system call using the host process, wherein state changes in the host-process virtual address space caused by the trapped system call are reflected in the guest-process virtual address space; and
causing execution of the guest process to be resumed after performing the trapped system call.

18. The non-transitory computer readable medium of claim 17, wherein trapping the system call invoked by the guest process further comprises:
protecting a model-specific register associated with a system-call target address from at least one of read access and write access;
catching a general protection exception caused by the guest process attempting to read the protected model-specific register associated with the system-call target address; and
responsive to determining the general protection exception is associated with an emulated system call, extracting a system call number and one or more system-call arguments associated with the trapped system call.

19. The non-transitory computer readable medium of claim 17, wherein mapping the host-process virtual address space and the guest-process virtual address space to the host physical memory further comprises:
intercepting a memory-management system call to modify a memory mapping of the guest-process virtual address space; and
performing the modification of the memory mapping on both the guest-process virtual address space and the host-process virtual address space.

20. The non-transitory computer readable medium of claim 17, wherein performing the trapped system call using the host process further comprises:
modifying access protection of the host-process virtual address space to protect the host-process virtual address space from access; and
in responsive to a protection fault caused by the system call attempting to access a portion of the host-process virtual address space, mapping a new guest page to the accessed portion and release protection of the accessed portion.

* * * * *